United States Patent [19]

Konrad

[11] 4,400,804
[45] Aug. 23, 1983

[54] DRIVER FOR HIGH POWER SONAR SYSTEMS

[75] Inventor: William L. Konrad, Niantic, Conn.

[73] Assignee: The United States of America as represented by the Secretary of the Navy, Washington, D.C.

[21] Appl. No.: 301,488

[22] Filed: Sep. 14, 1981

[51] Int. Cl.³ .......................... G01S 7/52; G10K 11/00
[52] U.S. Cl. .................................... 367/137; 181/142; 367/92; 367/142
[58] Field of Search ................. 367/92, 101, 134, 137, 367/138, 142; 181/142; 322/4; 318/150, 151

[56] References Cited

U.S. PATENT DOCUMENTS

| | | | |
|---|---|---|---|
| 2,484,260 | 10/1949 | Whitney | 318/150 |
| 2,508,167 | 5/1944 | Jones | 318/141 |
| 3,613,069 | 10/1971 | Cary, Jr. et al. | 367/101 X |
| 3,667,012 | 5/1972 | Kilgore | 318/161 |
| 3,811,106 | 5/1974 | Tyrrell | 367/134 |
| 3,964,013 | 6/1976 | Konrad | 367/92 X |
| 4,182,967 | 1/1980 | Jordan | 310/74 |
| 4,210,971 | 7/1980 | Martin, Jr. | 367/134 |
| 4,266,180 | 5/1981 | Juvan | 322/4 |

Primary Examiner—Richard A. Farley
Attorney, Agent, or Firm—Robert F. Beers; Arthur A. McGill; Prithvi C. Lall

[57] ABSTRACT

A high power sonar pulse generator driven by a low power electrical motor wherein a flywheel, placed in the mechanical system, connects the small motor and large generator. Since the large power output from the pulse generator is required only intermittently, the energy stored in the rotating flywheel allows a small motor to effectively drive the large output pulse generator while a braking effect on the flywheel is used to vary the sonar impulse producing an advantageous FM glide.

3 Claims, 2 Drawing Figures

DRIVER FOR HIGH POWER SONAR SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to high power sonar pulse generators and more particularly to a high power sonar pulse generator driven by a low power electrical motor having a flywheel placed in the mechanical system connecting the small motor and large generator. Since the large power output from the pulse generator is required only intermittently, the energy stored in the rotating flywheel allows the small motor to effectively drive the large output pulse generator while a braking effect on the flywheel is used to vary the sonar impulse to produce an advantageous FM glide.

(2) Description of the Prior Art

Conventional high powered sonar pulse generators can draw over 200 kilowatts (kw) average power during pulse transmission periods of approximately one second. Each system requires a power supply to convert the AC power of the ship's bus to DC which in turn is applied to the driver amplifying stages. This ship's power supply actually must deliver somewhat more than 200 kw in view of power supply inefficiency. Furthermore, existing sonar transducer driving sources require use of either solid state devices or vacuum tubes. The instant invention provides a rugged motor generator system which permits high power sonar to be used on existing surface and subsurface platforms having limited primary electrical power or can be used to improve the reliability of existing sonar systems by eliminating high power electronics. The invention is also directly applicable to new sonar systems for future surface ships and submarines.

SUMMARY OF THE INVENTION

A driver for high power sonar systems comprising a controller through which power from a ship's bus is distributed to a motor which turns an output shaft linked mechanically to the input shaft of a slip clutch, the output shaft of which connects to the input shaft of a mechanical energy storage flywheel. The flywheel output shaft in turn, mechanically drives a high frequency alternator whose electrical output is regulated by a field control which functions to key the output pulse at operating frequency to the transducer while also controlling pulse amplitude thereby achieving a frequency modulated output to permit high processing gains in the sonar receiver. The flywheel gains mechanical energy from the motor during the relatively long time between sonar pulses and delivers energy at high power to the alternator during the short pulse transmission period, assuring that the demand on the ship's power supply is the average sonar power rather than the much higher power required during the transmit period. Such a driver system (either singly or using two systems arranged in parallel to form a parametric source) permits ships with limited primary electric power to be outfitted with high power/performance sonar while improving the reliability of such sonar systems by eliminating the need for high power electronics. The most novel feature of this invention is using a parametric source to achieve FM glide wherein two primary frequencies are radiated to generate a difference frequency based on the non-linearity of seawater's transmission characteristics.

Accordingly, an object of subject invention is to provide a high power sonar driver which can be operated using relatively low ship's power.

Another object of subject invention is to allow present and future surface ships and submarines with limited available power to be outfitted with high power sonar.

A further object of subject invention is to increase sonar system reliability by reducing required operating power and hence eliminating the need for high power electronics and system components.

Other objects, advantages and novel features of the invention will become apparent from the following detailed description when considered in conjunction with the accompanying drawings.

DESCRIPTION OF THE PREFERRED EMBODIMENT

As an example of the power advantage provided by the present invention consider a high power parametric sonar requiring 100 kw of electrical power at each frequency be fed to a transducer during its transmit pulse. In a non-storage, conventional power supply such a sonar would draw over 200 kw average power during the transmit pulse of perhaps one second duration. The ship's power supply however must deliver somewhat more than 200 kw considering power supply inefficiency. Using the energy storage system described herein the average power need be only the product of the pulse power and the duty cycle. If we assume 50 seconds between pulses the duty cycle is 1/50 and the long time, average power required is 200×1/50 or 4 kw. Again considering the efficiency of conversion, the power drawn from the ship's bus will still be only about 5 kw, a power readily supplied by even a small ship. Furthermore, in this example the motor need only supply about 6 horsepower to the flywheel-alternator system. The advantages of the instant invention are thus; a large reduction in power required from the ship's supply while still supplying a large amount of pulse power to the transducer, the high reliability and ruggedness of the system compared to the conventional electronic generators and finally a simple means of achieving a frequency modulated output to permit high processing gains in the sonar receiver.

Figure 1:
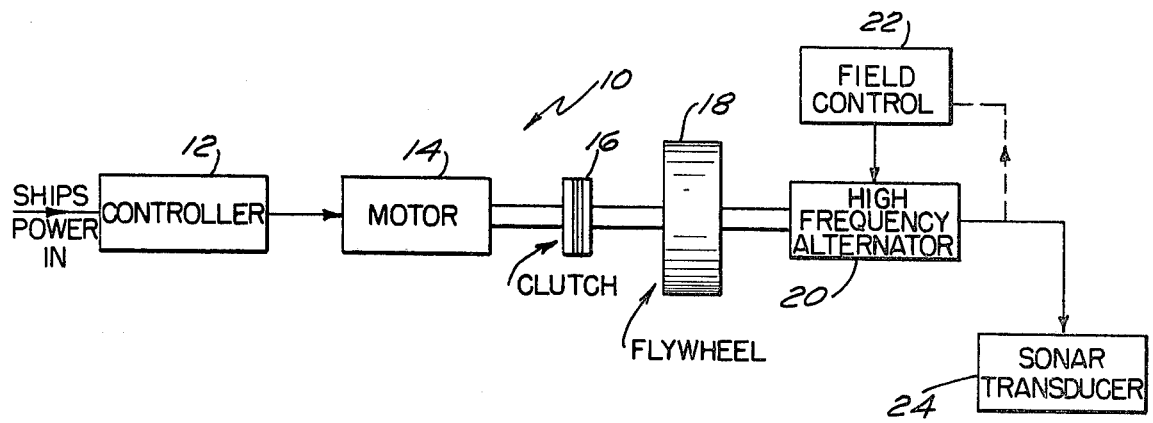
FIG. 1 is a block diagram of a high power sonar driver device built according to the teachings of subject invention.

Referring now to FIG. 1 there is shown a driver for a high power sonar system 10, comprising a controller 12 providing power, usually 3 phase, from a ship's bus to motor 14. The mechanical output of motor 14 is connected through a slip clutch 16 to a flywheel 18. The slip clutch is required to decouple the motor from the flywheel during startup and as the flywheel slows during the pulse transmission. Motor torque is thereby limited thus minimizing the power drawn from the ship's supply. The flywheel gains mechanical energy from the motor during the relatively long time between sonar pulses and delivers energy at high power to a high frequency alternator 20 during the short pulse transmission period. Therefore, the resulting demand on the ship's supply is the average sonar power rather than the much higher power needed during the transmit period. In typical cases the average power will be 1/10 to 1/100 of the pulse power during transmit.

The high frequency alternator 20 directly generates the sonar transmission frequency. Its speed and number of poles allow the generation of frequencies up to at least 25 or 30 kHz if desired. A field control 22 performs the function of keying the pulse to the transducer 24 and also, if desired, can maintain constant power output during the pulse by compensating for the decreasing speed of the alternator during the transmit time. The output of alternator 20 is fed to the transducer which converts the electrical power to acoustic power and radiates the acoustic pulse into the water. If desired, an FM pulse can be generated by appropriate flywheel design allowing a speed reduction during the pulse.

Figure 2:
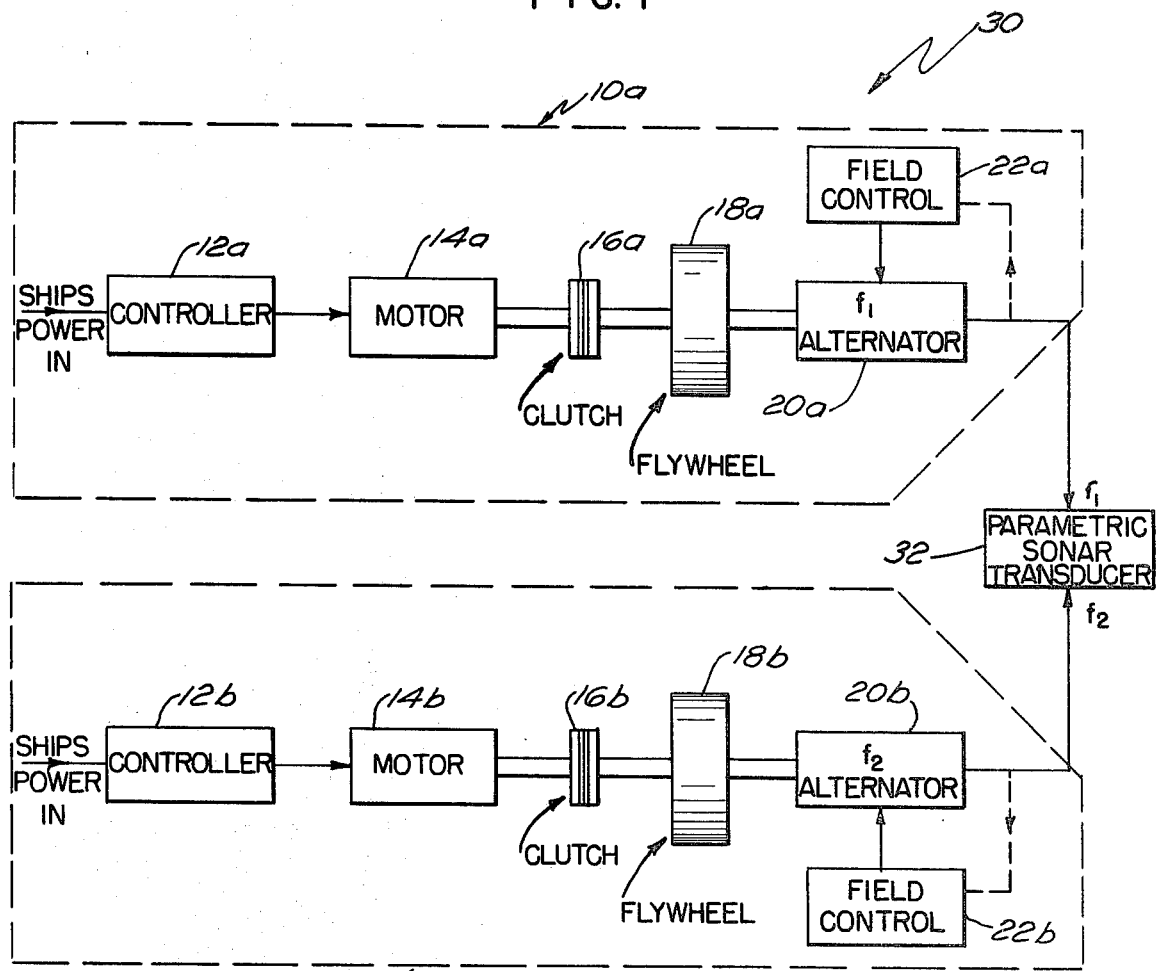
FIG. 2 is a block diagram of another embodiment of a high power sonar driver device built according to the teachings of subject invention.

Referring now to FIG. 2 there is shown a second embodiment of the present invention. High power parameteric sonar system 30 comprises two parallel high power sonar drivers, 10a and 10b, driving parametric sonar transducer 32. Drivers 10a and 10b each comprise controllers 12a and 12b, motors 14a and 14b, slip clutches 16a and 16b, flywheels 18a and 18b, alternators 20a and 20b, and field controls 22a and 22b respectively. The parametric implementation is particularly important and useful because of the higher power required by a parametric source to provide a given source level at the operating frequency. Basically the parametric system consists of two of the driver systems, 10 supra, operating at different frequencys, $f_1$ and $f_2$. The difference of these frequencies is the operating frequency. To produce an FM glide at this difference frequency, the lower frequency $f_1$ flywheel is made somewhat smaller than the $f_2$ frequency flywheel so as to result in a more rapid slowdown during the pulse to produce an upward or ascending difference frequency. This at least partially compensates for the loss of alternator output during the pulse because the parametric source becomes more efficient as the difference frequency increases. Also the field controllers 22a and 22b can be used not only to key the source but also if desired to control the pulse amplitude.

What has thus been described is a driver for high power sonar systems comprising a controller through which power from a ship's bus is distributed to a motor which turns an output shaft linked mechanically to the input shaft of a slip clutch, the output shaft of which connects to the input shaft of a mechanical energy storage flywheel. The flywheel output shaft in turn, mechanically drives a high frequency alternator whose electrical output is regulated by a field control which functions to key the output pulse at operating frequency to the transducer while also controlling pulse amplitude thereby achieving a frequency modulated output to permit high processing gains in the sonar receiver. The flywheel gains mechanical energy from the motor during the relatively long time between sonar pulses and delivers energy at high power to the alternator during the short pulse transmission period, assuring that the demand on the ship's power supply is the average sonar power rather than the much higher power required during the transmission period. Such a driver system (either singly or using two systems arranged in parallel to form a parametric source) permits ships with limited primary electric power to be outfitted with high power/performance sonar while improving the reliability of such sonar systems by eliminating the need for high power electronics. The most novel feature of this invention is using a parametric source to achieve FM glide wherein two primary frequencies are radiated to generate a difference frequency based on the non-linearity of seawater's transmission characteristics.

Obviously, many modifications and variations of the present invention are possible in light of the above teachings. For example, the functions of the alternator and the flywheel can be combined by means of a large diameter alternator rotating field to provide the necessary moment of inertia. In the case of the parametric sonar the basic arrangement can be modified so that a single motor and flywheel drives an alternator with a single armature excited with two rotating fields, each field having a different number of poles. The output of the motor would then consist of the necessary two frequencies. Again an FM glide would be achieved when the alternator slows during the pulse. It is therefore understood that within the scope of the appended claims the invention may be practiced otherwise than specifically described.

What is claimed is:

1. A high power sonar system driver comprising:
controller means, adapted to receive low power, for regulating said low power;
electric motor means for receiving said low power from said controller means and converting said low power to rotary shaft motion;
clutch means for receiving said rotary shaft motion from said electric motor means and selectively transmitting said rotary shaft motion;
rotating flywheel means for receiving said rotary shaft motion from said clutch means and converting said rotary shaft motion to stored rotational kinetic energy;
high frequency alternator means for receiving said stored rotational kinetic energy from said rotating flywheel means and converting said rotational kinetic energy to a high power FM pulse;
field control means for monitoring said high power FM pulse and keying said high power FM pulse to the rotational velocity of said rotating flywheel means; and
sonar transducer means for receiving said high power FM pulse from said high frequency alternator means and radiating said FM pulse as a high strength acoustic signal.

2. A high power parametric sonar system driver, comprising:
first controller means, adapted to receive low power, for regulating said low power;
second controller means, adapted to receive low power, for regulating said low power;
first electric motor means for receiving said low power from said first controller means and converting said low power to rotary shaft motion;
second electric motor means for receiving said low power from said second controller means and converting said low power to rotary shaft motion;
first clutch means for receiving said rotary shaft motion from said first electric motor means and selectively transmitting said rotary shaft motion;

second clutch means for receiving said rotary shaft motion from said second electric motor means and selectively transmitting said rotary shaft motion;

first rotating flywheel means for receiving said rotary shaft motion from said first clutch means and converting said rotary shaft motion to stored rotational kinetic energy;

second rotating flywheel means for receiving said rotary shaft motion from said second clutch means and converting said rotary shaft motion to stored rotational kinetic energy;

first high frequency alternator means for receiving said stored rotational kinetic energy from said first rotating flywheel means and converting said rotational kinetic energy to a first high power FM pulse at a first frequency $f_1$;

second high frequency alternator means for receiving said stored rotational kinetic energy from said second rotating flywheel means and converting said rotational kinetic energy to a second high power FM pulse at a second frequency $f_2$;

first field control means for monitoring said first high power FM pulse and keying said first high power FM pulse to the rotational velocity of said first rotating flywheel means;

second field control means for monitoring said second high power FM pulse and keying said second high power FM pulse to the rotational velocity of said second rotating flywheel means; and parametric sonar transducer means for receiving said first high power FM pulse from said first alternator means and said second high power FM pulse from said second alternator means whereupon said first frequency $f_1$ and said second frequency $f_2$ are combined such that the difference frequency $f_2-f_1$ is radiated as a high strength acoustic signal.

3. A high power parametric sonar system driver according to claim 2 wherein said first rotating flywheel means has a smaller diameter than said second rotating flywheel means resulting in more rapid slowdown during said first and second high power FM pulses and hence an upward or ascending difference frequency thereby producing an FM glide effect.

* * * * *